United States Patent

[11] 3,603,371

| [72] | Inventor | Anton Müller<br>Unterkochen, Wurttemberg, Germany |
|---|---|---|
| [21] | Appl. No. | 784,531 |
| [22] | Filed | Dec. 3, 1968 |
| [45] | Patented | Sept. 7, 1971 |
| [73] | Assignee | Eisen-und Drahtwerk Erlau AG<br>Aalen, Wurttemberg, Germany<br>Continuation-in-part of application Ser. No.<br>535,306, Mar. 11, 1966, now abandoned. |

[54] ANTISKID AND TIRE PROTECTIVE CHAINS
14 Claims, 24 Drawing Figs.

[52] U.S. Cl. ................................................. 152/239, 152/243
[51] Int. Cl. .................................................. B60c 27/07, F16g 13/00
[50] Field of Search .......................................... 152/239, 243, 240

[56] References Cited
UNITED STATES PATENTS

| 925,161 | 6/1909 | Curtis ........................ | 152/239 |
|---|---|---|---|
| 1,486,696 | 3/1924 | Snodgrass .................. | 152/239 |
| 2,086,512 | 7/1937 | Reyburn ..................... | 152/239 |
| 2,179,983 | 11/1939 | Nesbitt ....................... | 152/243 |
| 1,813,274 | 7/1931 | Brooks ....................... | 152/239 |
| 1,872,757 | 8/1932 | Labbe ........................ | 152/239 |
| 2,633,888 | 4/1953 | Vecchioni ................... | 152/239 |
| 3,382,906 | 5/1968 | Muller et al. ................ | 152/243 |

FOREIGN PATENTS

| 393,950 | 11/1965 | Switzerland ................ | 152/239 |

*Primary Examiner*—Arthur L. La Point
*Assistant Examiner*—Howard Beltran
*Attorney*—Walter Becker

ABSTRACT: Skid chain for vehicle tires in which strands of chain are arranged in zigzag paths in that portion of the skid chain which extends over the thread of the tire with the deviating points of the chain strands connected to each other and to lateral members at the sides of the skid chain. Double hooks are provided for fastening and detaching with respect to chain links interconnected thereby. These hooks are open for quick assembly and disassembly yet sufficiently restricted for resilient interfit.

PATENTED SEP 7 1971 3,603,371

Inventor:
Anton Müller by

Inventor:
Anton Müller

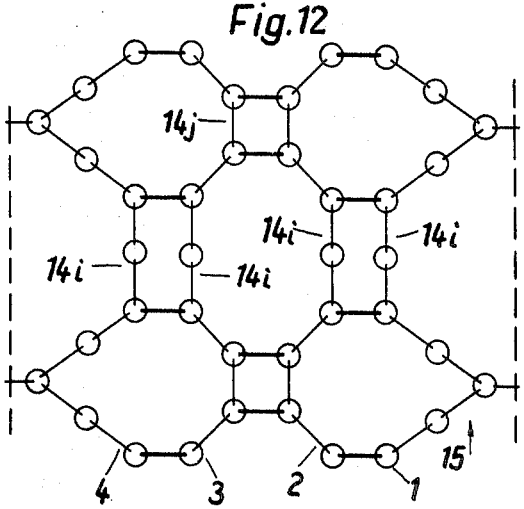
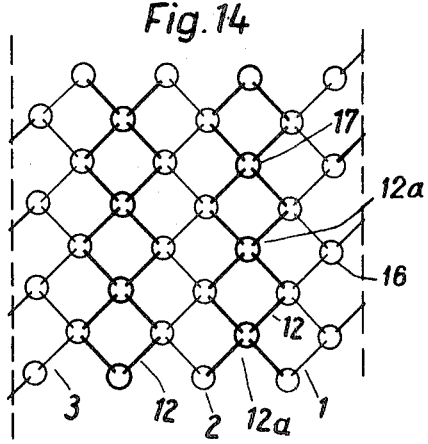
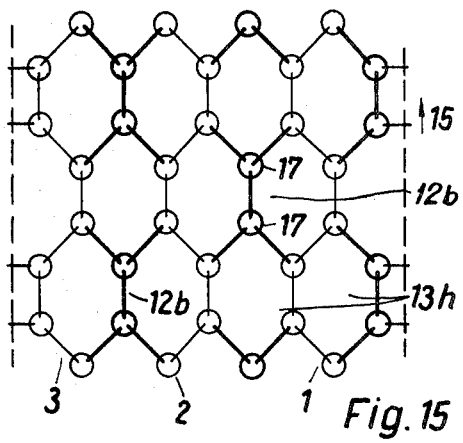
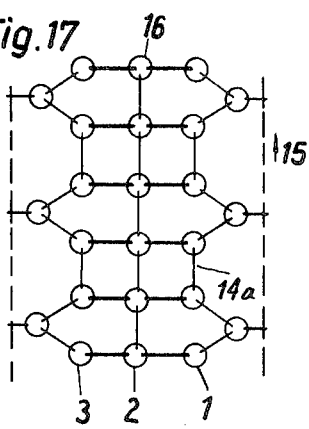
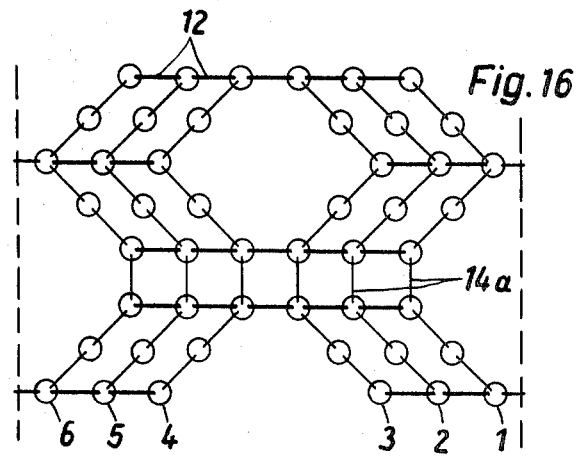

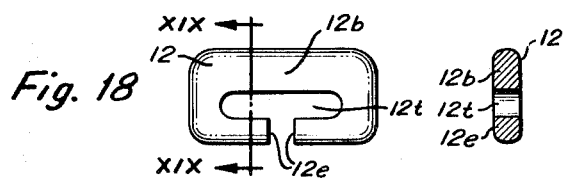
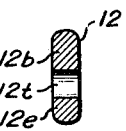
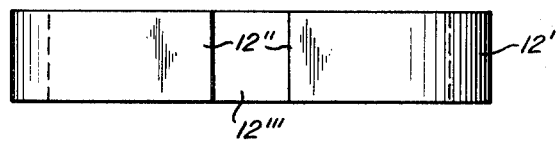
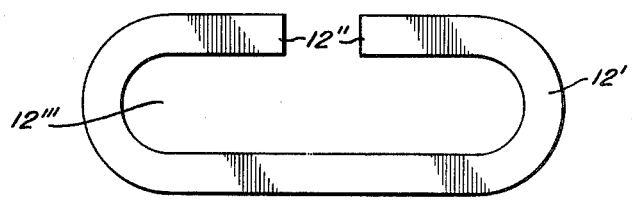
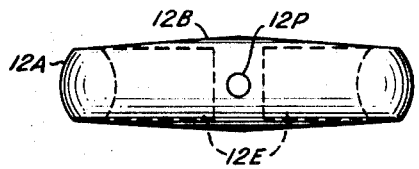
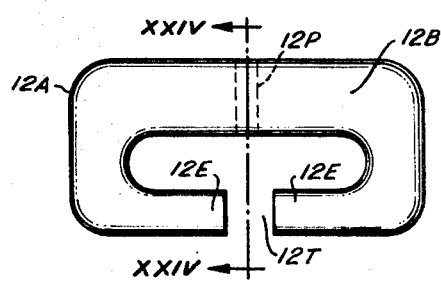
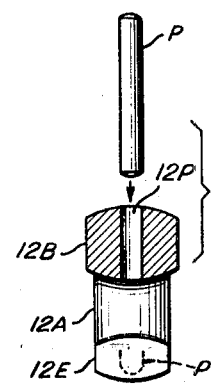
INVENTOR.
ANTON MÜELLER 3,603,371

ANTISKID AND TIRE PROTECTIVE CHAINS

This is a continuation-in-part of my copending U.S. application Ser. No. 535,306 filed Mar. 11, 1966 (now abandoned) on "ANTISKID AND TIRE PROTECTIVE CHAINS AND METHOD OF MAKING SAME."

The present invention relates to antiskid and tire protective chains which comprise individual interconnected links adapted to be connected to a motor vehicle wheel by lateral chain sections. More specifically, the present invention concerns chains of the just-mentioned character and also a method of making same.

In connection with the manufacture of antiskid and tire protective chains, it is known to compose individual chain links to a chain. The individual links are, for instance, connected to form a netlike chain with the connecting members having the shape of open eyes, hooks or the like. After the individual links have thus been temporarily connected they are permanently connected to each other by welding or pressing the ends of the links against each other. A drawback of such a chain construction consists in the fact that the chain, due to the required numerous individual links and due to the assembly work, are rather expensive to manufacture. Moreover, each chain size fitting a different tire requires different tools and devices which likewise increase the cost of manufacture of such chains.

It is, therefore, an object of the present invention to provide an antiskid and tire protective chain and method of making the same which will greatly reduce the cost of manufacturing antiskid and tire protective chains of the above-mentioned general character.

It is another object of this invention to provide an antiskid and tire protective chain which can be produced in long lengths so that the necessary length of the chain to be produced can be cut off from the manufactured chain length.

It is another object of this invention to provide an antiskid and tire protective chain which has highly satisfactory skid-protective properties and will assure a safe guiding of the tier on the ground over which the tire drives.

These and other objects and advantages of the invention will appear more clearly from the following specification in connection with the accompanying drawings, in which:

FIG. 1 diagrammatically illustrates a portion of an antiskid and tire protective chain according to the invention.

FIG. 12 illustrates still another modification of arrangement of connecting members for a tire protective chain.

FIG. 14 shows additionally modified arrangement of connecting members between deviating points of a tire protective antiskid chain.

FIG. 15 shows still another configuration of connecting members joined at deviating points with respect to a tire protecting antiskid chain.

FIG. 16 shows still another configuration of transverse location of connecting members for chain strands having differing deviating points.

FIG. 17 shows a modification of transverse location of connecting members provided with chain strands having linear and deviating connecting points locations.

FIG. 18 shows a side view of a connecting member. FIG. 19 is a cross-sectional view taken along line XIX—XIX in FIG. 18.

FIG. 20 is a top view of another connecting member.

FIG. 21 is a side or elevational view of the connecting member of FIG. 20.

FIG. 22 is a top or plan view of a connecting member further in accordance with the present invention.

FIG. 23 is a side elevational view of the connecting member of FIG. 22.

FIG. 24 is an exploded view of a pin and connecting member with the latter being illustrated in a cross section taken along line XXIV—XXIV in FIG. 23.

Figure 1:
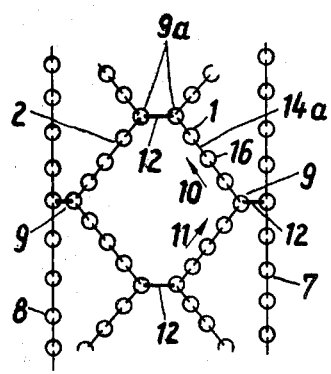

The antiskid and tire protective chains are constructed of individually interconnected links which are connected to the motor vehicle wheel by lateral chain portions, two or more chain strands are without crossing each other passed over the tire tread area in changing directions, and the thus provided individual profile strands are, within the range of the direction deviating areas, held by chain portions while the outwardly located deviating areas on the lateral chain portions and the inwardly located deviating areas of the chain strands arranged alongside each other are interconnected with this method, the antiskid chain can be produced at low cost from endless prefabricated chain strands. The adaptation of the chain to desired tire sizes is effected in a simple manner by locating the deviating areas of the chain strands at the suitable points. The length of the chain which corresponds to the circumference of the motor vehicle wheel is obtained by cutting a corresponding length from a prefabricated chain band.

A further advantage of the method according to the present invention consists in that the chain can be at least partially produced automatically and consequently at a lower cost than heretofore known chains of the type involved. Furthermore, the method according to the invention considerably reduces the stocking of different size semifinished products and consequently also the cost of stocking the chain parts.

An antiskid chain according to the present invention is, therefore, characterized primarily in that at least one chain strand is located in a zigzag shape on the tire tread surface. When two chain strands are located in a zigzag-shaped manner they are advantageously so arranged that the chain strands form the sides of quadrangles, preferably of a rhombus or of a diamond-shaped structure which approximately cover the entire tire tread surface. The outer corners of such rhombuses are connected to the chain side portions either directly or through the intervention of intermediate links such as web links, round links, rings, etc., whereas the inner corners of such rhombuses are interconnected.

An advantageous embodiment of a chain according to the invention is obtained by having a chain link from at least one direction deviating area extend in the direction of vehicle travel. The thus-formed track member assures a safe guiding of the motor vehicle wheel on the road.

According to a further feature of the invention, the quadrangles or rhombuses are asymmetrically preferably so designed that the track portions are located outside the center of the tire tread surface.

According to a further development of the present invention, the chain strands may form triangles while a track member of one side of the triangle and the other chain section forms the two other sides of the triangle. The triangles have their tips pointing toward the lateral surfaces of the tires while the track members forming one side of the triangles are alternately formed by two chain strands. Also in this instance, the track members may be located asymmetrically outside the center of the tire tread surface whereby triangles of different sizes are obtained.

The chain strands may be composed of ring members, or round steel links and ring members, and web members interconnecting the same. Moreover, the ring members may also be designed oval or oblong, or may be distorted. Advantageously, the ring members or round steel chain links are provided with wear rollers. The ends of the track members of the chain strands may be connected to each other and to the lateral portions of the chain, for instance, by single or double hooks, heart-shaped members and the like.

Referring now to the drawing and FIG. 1 thereof in particular, the antiskid chain shown therein comprises primarily two oppositely zigzag-shaped chain strands 1, 2 which are located between two lateral chain portions 7, 8. Portions 7 and 8 are at the sides of the tire and strands 1 and 2 extend over the tire tread. The chain strands 1, 2 extend in different directions as indicated by the arrows 10 and 11 and, within the range of the points 9, 9a in the change of the direction are by means of transverse connecting members 12 connected to the lateral chain portions 7, 8. The two chain portions 1, 2 which may be prefabricated as endless strands can be produced at low cost and can be assembled in a simple manner to the chain illustrated in FIG. 1. The adaptation of the chain to the width of the tire tread surface, which corresponds approximately to the distance between the two chain portions 7, 8, is effected in a simple manner by providing a sufficient number of links between the direction-changing areas 9, 9a. The antiskid chain according to the invention may be produced of any desired length and may subsequently be cut to the required length.

Figure 2:
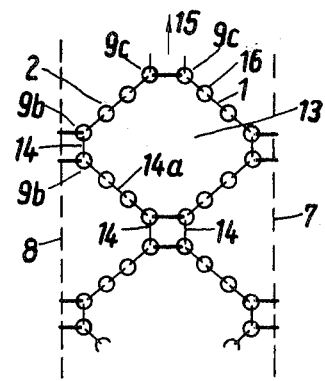
FIG. 2 illustrates a chain similar to that of FIG. 1 but provided with track pieces and an additional transverse web member.

According to the embodiment of the chain illustrated in FIG. 2, there are also provided two chain strands 1, 2 which have an oppositely directed zigzag-shaped course and are located between lateral chain portions 7, 8 in such a way that the chain strands 1, 2 form the sides of rhombus 13. Within the range of each corner of each rhombus 13, there are, however, two direction-changing areas or points 9b, 9c between which a chain link 14 is located which extends in the circumferential direction of the tire indicated by the arrow 15. These so-called track members 14 of which in the central area between the two chain portions 7, 8 there are always provided two adjacent to each other, assure a safe guiding of the motor vehicle wheel provided with said antiskid chain.

Figure 3:
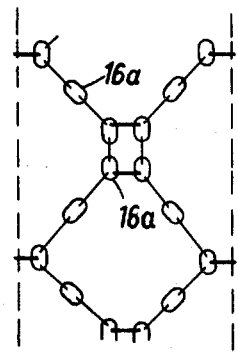
FIG. 3 illustrates a chain similar to that of FIG. 1 but differing therefrom primarily in that oblong links are employed.

While the chain strands 1, 2 illustrated in FIGS. 1 and 2 are composed of ring links 16 which are interconnected by web members 14a, the embodiment illustrated in FIG. 3 employs oblong members 16a or round star chain links or other links of known contour.

Figure 4:
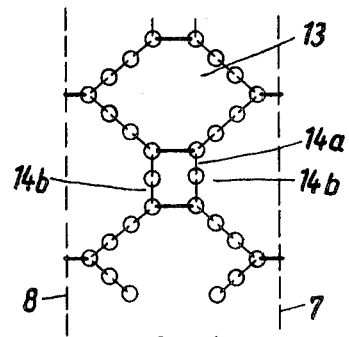
FIG. 4 illustrates a chain similar to that of FIG. 1 but provided with differing connecting member arrangement.
Figure 5:
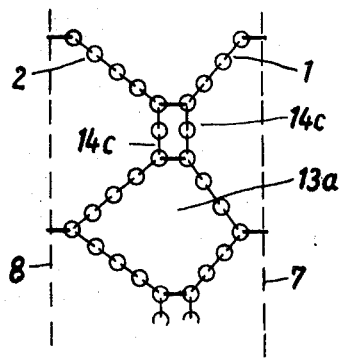
FIG. 5 illustrates a chain similar to that of FIG. 4 but differing therefrom primarily in arrangement of deviating points of strands.

As will be seen from FIGS. 4 and 5, the track members 14b, 14c may also be arranged within the intermediate range between the two lateral chain portions 7, 8. The track members 14b are each composed of two web members 14a. However, a plurality of web members arranged one behind the other may be interconnected to form the track members. Whereas with the antiskid chain shown in FIG. 4, the two track members 14b are located between two rhombuses 13, the track members 14c of the embodiment shown in FIG. 5 are located outside the intermediate area between the two lateral chain portions 7, 8 in such a way that asymmetric rhombuses 13a are formed.

Figure 6:
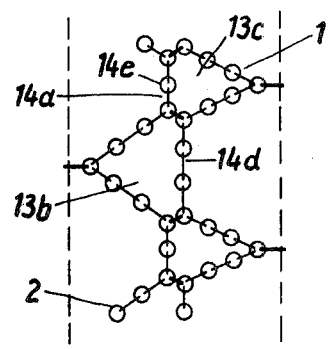
FIG. 6 illustrates a chain having an entirely different configuration of interconnections and deviating points for strands yet in accordance with the teaching of the present invention.
Figure 7:
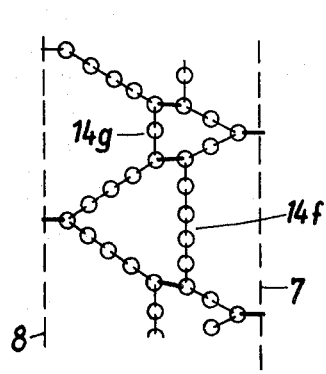
FIG. 7 illustrates antiskid and tire protective chains in which the links are combined to form triangular formations differing from those in FIG. 6.

With the embodiments illustrated in FIGS. 6 and 7, the two chain strands 1, 2 form acute-angled triangles while always a track member 14d or 14e of a chain strand 1, 2 forms one side of the triangles 13c, 13b alternately formed by the two chain strands 1, 2. The triangles 13c formed by the chain strand 1 confine a smaller angle than the corresponding likewise outwardly directed triangles 13b of the other chain strand 2. The track members 14d formed by the chain strand 1 are each composed of three web members 14a, whereas the track members 14e formed by the chain strand 2 each comprise only two web members 14a. Instead of two or more web members of the lateral strand and the track member, also one or more extended web members may be provided. With the embodiment illustrated in FIG. 7, the track members 14f, 14g are located outside the central area between the two lateral chain portions 7, 8.

Figure 8:
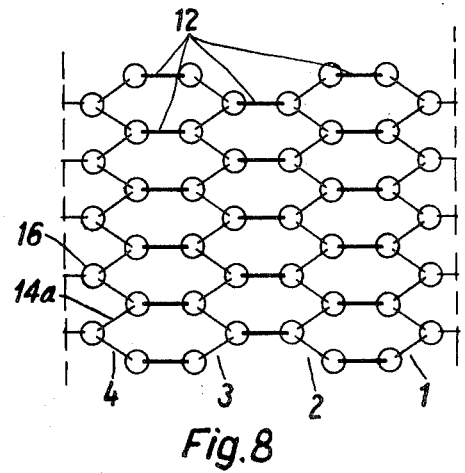
FIG. 8 illustrates a further modification of antiskid and tire protective chain structure using transverse interconnecting means in offset relationship to each other.

As will furthermore be evident from FIG. 8, a plurality of chain strands 1 to 4 may in oppositely directed zigzag manner be placed with regard to each other and may be interconnected by connecting members 12. The direction of the chain strands 1 is reversed after each annular member 16 so that the directly adjacent web members 14a extend in different directions.

Figure 9:
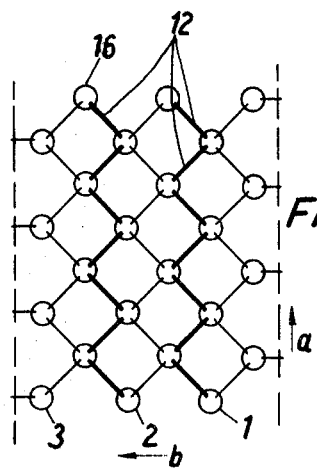
FIG. 9 illustrates a further modification of an antiskid and tire protective chain provided with connecting members between differing deviating points.

According to the embodiment illustrated in FIG. 9, the chain strands 1 to 3 have a unidirectional zigzag shape while each ring member 16 by means of two connecting members 12 is connected to two further ring members 16 so that a net-shaped antiskid chain id formed. The running direction may be either in conformity with the arrow a or in conformity with the arrow b.

Figure 10:
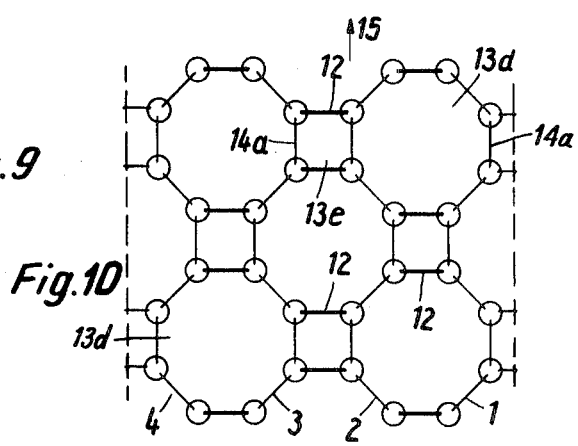
FIG. 10 illustrates another modification of antiskid and tire protective chain structure further in accordance with the present invention.

As illustrated in FIG. 10, a plurality of chain strands 1 to 4 may be so located that they confine honeycomb-shaped surfaces 13d. The length of the edges of the honeycombed surfaces 13d corresponds approximately to the length of the web member 14a. Between the individual honeycomb-shaped surfaces 13d there are provided rectangular surfaces 13e which are each confined by two connecting members 12 so-called transverse members and by two web members 14a. The web members 14a, which extend in the circumferential direction of the tire indicated by the arrow 15 which pertain to the honeycomb-shaped surfaces 13d and the rectangular surfaces 13e serve as track members for guiding the vehicle wheel. However, if desired, a plurality of web members or a correspondingly long web member may be provided. Track members which are located adjacent to each other are interconnected by transverse members, for instance, transverse webs 12. These webs 12 bring about an increased gripping effect and reduce the wear of the remaining members.

Figure 11:
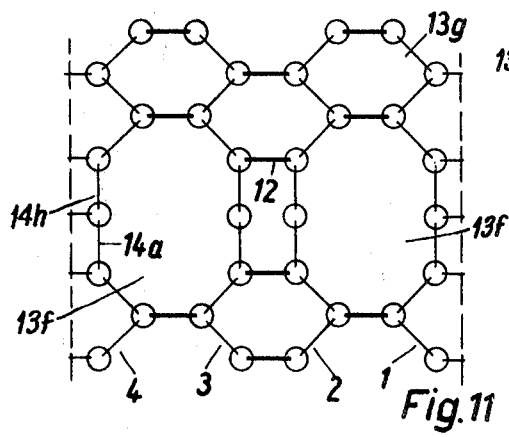
FIG. 11 illustrates another modification of location of deviating points and connecting members for an antiskid and tire protective chain.

As shown in FIG. 11, the track members 14h may also comprise a plurality of web members 14a. According to the embodiment illustrated in FIG. 11, the chain strands 1 to 4 each confine octagonal surfaces 13f which in circumferential direction of the tire as indicated by the arrow 15 are arranged alongside each other, and in the range of the ends of their track members 14a are connected to each other by connecting members 12. In tire circumferential direction indicated by the arrow 15, the octagonal surfaces 13f are followed by three hexagonal surfaces 13g which form the transition area to two further octagonal surfaces 13f.

According to the embodiment illustrated in FIG. 12, the chain strands 1 to 4 are so located that four adjacent track members 14i are formed with two web members 14a each. Between each four adjacent members 14i there are provided two track members 14j composed of one web member 14a each.

Figure 13:
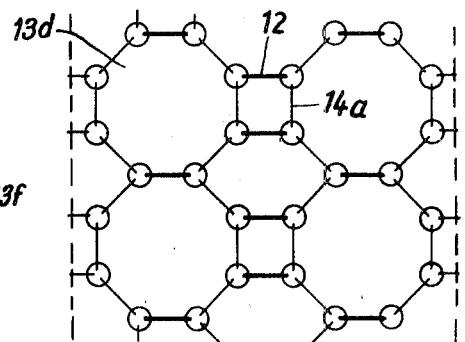
FIG. 13 illustrates still another arrangement of connecting members with a tire chain arrangement.

Referring now to FIG. 13, the embodiment of the invention illustrated therein differs from that of FIG. 10 primarily in that only between those octagonal surfaces 13d which are located transverse to the tire circumferential direction indicated by arrow 15 and are arranged adjacent to each other, there are provided tow connecting members 12 and thus two web members 14a extending in the track direction.

A particularly advantageous embodiment of the invention is obtained by composing the connecting members of a plurality of double hooks 12, heart-shaped members or the like which are preferably in a star-shaped manner arranged on a ring 17 or the like. Such connecting members 12a are employed with the antiskid chain of FIG. 14. The endless chain strands 1 to 3 of the chain shown in FIG. 14 extend in oppositely directed zigzag-shaped manner. Each connecting member 12a is by means of two double hooks 12 connected to two ring members 16 of a chain strand 1, 2, 3 and by means of two double hooks 12 to two ring members 16 of another chain strand 2, 3. The thus obtained net-shaped chain corresponds to that of the embodiment illustrated in fig. 9.

As will be seen from FIG. 15, the connecting members 12b may also comprise rings 13 each two of which are interconnected by a double hook 12. Said rings 13 are each provided with two further double hooks 12. Rings 17 are in tire circumferential direction indicated by the arrow 15 arranged one behind the other while the chain strands 1 to 3 form the image to each other so that in tire circumferential direction, as indicated by the arrow 15, longitudinal honeycomb-shaped surfaces 13h are formed.

With the embodiment illustrated in FIG. 16, three chain strands each 1 to 3; 4 to 6 are arranged parallel to each other while the strand groups 1 to 3 and 4 to 6 extend oppositely to each other. The chain strands 1 to 6 follow approximately a zigzag-shaped path while those portions of the chain strands 1 to 6 which extend toward each other have each a web member 14a extending in the track direction. At the direction-changing areas, the chain strands 1 to 6 are interconnected by connecting members 12.

As shown in FIG. 17, if desired, a chain strand 2 may also extend in the circumferential direction of the tire as indicated by the arrow 15 so that this chain strand 2 in its entirety serves as a track member. The chain strand 2 is located between the two oppositely zigzag-shaped further chain strands 1, 3 which while extending in a zigzag-shaped manner include individual web members 14a located in track direction. Each ring member 16 of chain strand 2 extending in the circumferential direction of the tire, is by means of two connecting members 12 which extend transverse to the circumferential direction of the tire, connected to corresponding ring members 16 of the outwardly located chain strands 1, 3.

The connecting members 12, which in FIGS. 1 to 7 are indicated by heavier lines than the lines indicating the web members 14a, may be formed by double hooks, heart-shaped members or the like.

It is, of course, to be understood that the present invention is, by no means, limited to the specific forms of the chains illustrated in the drawings, but also comprises any modifications within the scope of the invention. Thus, the structures of the antiskid chains illustrated in FIGS. 1 to 17 may be combined with each other so that, for instance, in the laterally outer range of the tire tread surface, the antiskid chain will have a structure which differs from the chain structure in the inner range of the tire tread surface. Furthermore, the antiskid chains may be widened by laterally adding thereto additional chain strands.

The meaning of the term "hooks" as also applicable to "-double hooks" 12 relates to a chain member which is adapted to be fastened and detached repeatedly. This occurs only with an open hook member having a releasable cutout or safety mechanism for selective locking and unlocking relationship with respect to other chain portions or chain members. The open characteristics of the double hooks 12 previously noted are thus releasable or detachable by displacement to effect opening and release of the interconnection established thereby. The double hooks or connecting elements 12 permit easy assembly and disassembly of the chain, while permitting the chain to be made up from conventionally manufactured lengths of a series of links joined together for inexpensive and rigid segments produced on a conventional chain-making machine. The double hook or detachable connecting elements 12 are illustrated in detail in views of FIGS. 18 through 24 of the drawings representing embodiments thereof particularly advantageous for use in accordance with the present invention and each having a substantially C-shaped body terminating in opposite ends axially in alignment with each other.

FIG. 18 provides a side elevational view of a double hook element or detachable link means 12 having rolled rounded edging, as is clearly shown in the cross-sectional view of FIG. 19 taken along line XIX—XIX in FIG. 18. FIGS. 18 and 19 clearly show that a substantially flat main body portion 12b is provided which is substantially one-half the height of the element 12 and which is solid throughout except for a recess or T-shaped opening 12t having opposite ends 12e adjacent thereto. Space directly between the ends 12e is less than distance from the ends 12e to the main body portion 12b. For example, the axial distance between the ends 12e is 4.5 mm. while the distance laterally from the ends 12e to the main body 12b is 4.8 mm. Thus, the clearance for the chain links installed into the cutout 12t is such that a snap or press fit occurs while forcing a cross section of the link through the axial space between the ends 12e of the element 12. The temporary deflection or displacement of the ends occurs for fastening and detaching links 12 with respect to the other links or elements forming the chain structure. The total length of the double hook element 12 is 32 mm. and the total height is 16 mm. while the total depth of the cross section in FIG. 19 is 4.7 mm. The distance from an outer edge of the ends 12e to the center line of the arcs at opposite ends of the T-shaped slot or cutout 12t is 6 mm. and the distance axially between center lines for these end arcs is 15.7 mm. The material preferably is an alloy of manganese and chromium (16 Mn-Cr 5).

FIG. 20 shows an elongated edge view of a double-hooked element 12′ having ends 12″ axially spaced from each other for a distance therebetween less than the opening 12‴ centrally thereof. For example, the distance axially between the ends 12″ is 6.5 mm. and the lateral width of the cutout 12‴ is 9 mm. which is more than the 6.5 mm. between ends 12″. Double hook element 12′ is made of flat strip steel having slightly rounded edges and having a cross-sectional width of 3 mm. The total depth of the strip steel is 8 mm., as viewed in FIG. 20 and the overall length, as seen in FIG. 21 is 43 mm., for example. The elevational dimension laterally with respect to the ends 12″ to the element 12′ is 15 mm. The axial distance between center lines of the inner arcs of the cutout 12‴ is 28 mm. The steel used for the double hook element 12′ is designated as DIN-1016.

FIGS. 22, 23 and 24 illustrate double hook means 12A having a main body portion 12B and opposite ends 12E similar to structure illustrated by FIGS. 18 and 19. Preferably, the double hook means of FIGS. 22, 23 and 24 has the cross section as illustrated in FIG. 24 taken along line XXIV—XXIV of FIG. 23. The height and depth of the main body portion 12B is considerably greater and more rigid than comparable size of the ends 12E which are thus adapted to permit snug passage of interfitting pairs of chain links through the space between the axially separated ends 12E. The distance axially between the ends 12E is in a range between 8.5 and 10 mm., whereas lateral distance from the ends 12E to the main body portion 12B is again less than the value of the axial distance between the ends 12E. Laterally from the outer peripheral edge of the ends 12E to the center line of the arcuate space at opposite ends of a T-shaped cutout 12T is a distance of between 10 and 12 mm., for example. A passage 12P is provided as bored, for example, through the main body portion 12B and a pin P or tensioning sleeve is forced into this passage or bore 12P after assembly of the chain links with respect to the cutout 12T. These tensioning hulls or pins are removable and maintain assembly of the chain links in opposite extremities of the transverse portion of the T-shaped cutout 12T. The axial distance between the ends 12E is partially blocked by an end of the pin or projecting hull P through the latter is removable or retractable with respect to the passage 12P during fastening and detaching of chain links with respect to the double hook element in accordance with the present invention. The main body 12B is thicker centrally than the width of the ends 12E, as can best be seen in views of FIGS. 22 and 24, respectively.

The use of the double hooks permits running strands or lengths of chain to be taken from a reel or drum so as to form any desired antiskid chain size of tire protective chain size and tire because the connecting links are arranged releasably with respect to the chain links of the antiskid chain means. In case a particular section or segment of running chain strands should break, it is possible to detach the same without difficulty and without any tools from the antiskid chain means. Replacement of a broken chain strand with a new section or segment is possible while still using the same detachable double hook connecting links having the configuration as shown in the latter views of the drawings.

Since the running chain strands according to the invention are detachably arranged, the configuration thereof can be altered for instance, by differing distances at which the detachable connecting links are mounted. This change may be so effected that the antiskid chain or tire protective chain according to the invention can be adapted to the respective prevailing conditions, as, for instance, road conditions, as deemed necessary. In the antiskid chain of the present invention, the running strand forms a circumferential track composed of pieces or chain sections, preferably a plurality of chain links. The track pieces extend circumferentially in a direction corresponding to the circumferential direction of a tire and are located outside the center of the antiskid chain. These track pieces or sections serve for laterally guiding the tire and considerably improve the driving properties of the antiskid chain.

Manufacture of a single tire of tire chain running strand cut off to any desired length and used in combination with the double hook connecting means permits formation of antiskid chains of differing sizes though only maintaining a stock of the same tire running chain strand. A less complicated and inexpensive manufacture of the chain structure is permitted while the connecting links are made to be detachable, as described in the latter views of the drawings. No cutting tool for breaking any welds or other permanent connections needs to be used for repair of the antiskid chain. Waste is eliminated since the interconnecting means formed of double hook elements that are detachable and reusable are provided, in accordance with the present invention. The same detachable connecting links can be used over and over again since they are not permanently deformed or destroyed during detachment and fastening with respect to the chain links.

The double hook elements are usable in a three-point support location favorably influencing the function of the tire antiskid chain, as for example, in the illustration of FIG. 15 of the drawings. Ring means 13 are used with the connecting members, as described earlier.

I claim:

1. An antiskid chain structure comprising: a pair of continuous lengths of outer chains formed of closed links, at least two continuous lengths of inner chains formed of closed links extending the full length of said outer chains, each of said inner chains being substantially longer than said outer chains, detachable links removable without deformation, each detachably connecting one of the closed links of an inner chain to a closed link of said outer chain so that portions of said inner chain between detachable links are of greater length than the length of outer chain between the same detachable links, and means connecting said inner chains, said means including other detachable links removable without deformation connected to closed links of said inner chains, so that said inner chains are connected to each other at points more closely spaced than their opposite connections to said outer chains, said detachable links being selectively engageable with links of said outer chains to adjust the relative spacing of the points of connection to said outer chains and said other detachable links being selectively connectable to adjust the distance spacing said outer chains.

2. An antiskid chain structure comprising: a pair of outer chains formed of closed links with said chains in parallel-spaced relation, inner chain means arranged in spaced relation in the space between said outer chains, said inner chain means including at least two chain strands formed of closed links and of substantially greater length than said outer chains extending circumferentially in paths which deviate at longitudinally spaced points to form outer deviating points adjacent an adjacent outer chain and inner deviating points remote from said adjacent outer chain, transverse first detachable connecting members, each removable without deformation connecting a closed link of an inner chain strand at an outer deviating point of each chain strand with a closed link of an outer chain, and second connecting members each connecting an inner deviating point of each inner chain strand with a deviating point of an adjacent inner chain strand positioned on the side of the first-mentioned strand which is opposite to the outer chain adjacent thereto, said inner chain strands defining therebetween polygons with at least two sides of each polygon formed by a single strand, each of said second connecting members including a detachable link removable without deformation and detachably connected to each of said inner chain strands, so that the width of the space between said outer chains may be adjusted by selectively connecting said detachable links to different links of said inner and outer chains and chain strands.

3. An antiskid chain structure according to claim 2, in which said chain means includes four strands each arranged relatively in a zigzag path, the deviating points of said strands being laterally aligned, alternate ones of said strands being parallel and adjacent ones of said strands alternately approaching and receding from each other, and transverse connector elements interconnecting the deviating points of adjacent strands which are nearest each other.

4. An antiskid chain structure according to claim 2, in which said chain means specifically includes at least one strand between said outer chains parallel thereto and at least one other strand between said one strand and each outer chain, said other strands following also angular deviated paths having outer deviating points near the pertaining outer chain and inner deviating points near said one strand, and transverse connecting members connecting the outer deviating points with the adjacent outer chain and said inner deviating points with said one strand.

5. An antiskid chain structure according to claim 2, in which said chain means specifically comprise strands arranged adjacent each other and disposed in zigzag paths, connecting members connecting the deviating points along each strand with deviating points of the adjacent strand, said strands and connecting members forming squares having diagonals extending transversely and longitudinally of the chain structure.

6. An antiskid chain structure according to claim 2, in which said chain means specifically comprise strands arranged adjacent each other and disposed in zigzag paths with the points of deviation of the paths of the respective strands laterally aligned, and connecting devices each having four members extending diagonally from a common center disposed between said strands and having the outer ends of said members connected to said points of deviation.

7. An antiskid chain structure according to claim 2, in which said two chain strands specifically form quadrangles in the space therebetween with each strand forming two adjacent sides of the quadrangle.

8. An antiskid chain structure according to claim 7, in which the inner deviating points of each strand are arranged in adjacent pairs, and each strand has at least one link extending in the longitudinal direction of the skid chain structure from one deviating point of each said pair to the other thereof, said inner deviating points being displaced laterally of a symmetrically central position between said outer chains.

9. An antiskid chain structure according to claim 2, in which said strands specifically form triangles in the space therebetween with each said triangle having a base side formed by one of said strands and extending parallel to said outer chains and its other sides formed by the other of said strands.

10. An antiskid chain structure according to claim 9, in which each said triangle specifically has its base side remote from a pertaining outer chain and its apex adjacent the said outer chain.

11. An antiskid chain structure according to claim 10, in which said base sides of said triangles specifically are located asymmetrically with respect to the longitudinal center line of the skid chain structure.

12. An antiskid chain structure according to claim 2, in which the inner deviating points of each strand respectively are arranged in adjacent pairs, each strand having at least one link extending in the longitudinal direction of the skid chain structure from one deviating point of each said pair to the other thereof, each said pair of inner deviating points of one of said strands being laterally spaced from those of the adjacent strand, and laterally extending connectors connecting each inner deviating point of said one strand with the corresponding inner deviating point of the other strand.

13. An antiskid chain structure comprising: a pair of outer chains formed of closed links with said chains in parallel-spaced relation, inner chain means arranged in spaced relation in the space between said outer chains, said inner chain means including chain strands formed of closed links extending circumferentially in paths which deviate at longitudinally spaced points to form outer deviating points adjacent a pertaining outer chain and inner deviating points remote from said pertaining outer chain, transverse first detachable connecting members removable without deformation and connecting a closed link of each outer deviating point of each chain strand with a closed link of the pertaining outer chain, and second connecting members connecting each deviating point of each strand with a deviating point of an adjacent strand positioned on the side of the first-mentioned strand which is opposite to the outer chain pertaining thereto, said chain strands defining therebetween polygons with at least two sides of each polygon formed by a single strand, each of said connecting members including at least one double hook element removable without deformation to provide for easy disassembly of each outer chain and each inner chain means, said chain means comprising a total of four strands each following a deviated path with the points of deviation of the paths of said strands being aligned laterally, said strands forming octagons, and lateral connecting members connecting said deviating points with each other and with said outer chains.

14. An antiskid chain structure according to claim 13, in which each strand has deviating points arranged in adjacent longitudinally spaced pairs, at least one link of each strand extending longitudinally between respective ones of a pair of deviating points, and lateral connecting members connecting the respective points of each said pair of deviating points with the corresponding deviating points of the next adjacent strand.